(12) United States Patent
Bentley et al.

(10) Patent No.: US 8,632,947 B2
(45) Date of Patent: Jan. 21, 2014

(54) THERMALLY REACTIVE INFRARED ABSORPTION POLYMERS AND THEIR USE IN A HEAT SENSITIVE LITHOGRAPHIC PRINTING PLATE

(75) Inventors: Peter Jonathan Bentley, Barcelona (ES); My T. Nguyen, Kirkland (CA)

(73) Assignee: Ipagsa Industrial, S.L., Rubi-Barcelona (ES)

(*) Notice: Subject to any disclaimer, the term of this patent is extended or adjusted under 35 U.S.C. 154(b) by 692 days.

(21) Appl. No.: 10/599,657

(22) PCT Filed: Nov. 8, 2005

(86) PCT No.: PCT/EP2005/012029
§ 371 (c)(1),
(2), (4) Date: Jun. 13, 2007

(87) PCT Pub. No.: WO2006/050937
PCT Pub. Date: May 18, 2006

(65) Prior Publication Data
US 2008/0261151 A1    Oct. 23, 2008

(30) Foreign Application Priority Data
Nov. 9, 2004  (EP) .................................... 04078079

(51) Int. Cl.
*B41M 5/00* (2006.01)
*G03F 7/00* (2006.01)
*G03F 7/26* (2006.01)

(52) U.S. Cl.
USPC ................ 430/270.21; 430/270.1; 430/270.2; 430/302; 101/453; 101/463.1

(58) Field of Classification Search
USPC .......................................................... 430/302
See application file for complete search history.

(56) References Cited

U.S. PATENT DOCUMENTS

| 6,124,425 | A | 9/2000 | Nguyen |
| 6,132,933 | A | 10/2000 | Nguyen et al. |
| 6,177,182 | B1 * | 1/2001 | Nguyen ..................... 428/319.3 |
| 2004/0131973 | A1 * | 7/2004 | Tao et al. ...................... 430/302 |

FOREIGN PATENT DOCUMENTS

| EP | 0823327 A | 2/1998 |
| EP | 1024958 A | 5/1999 |
| EP | 1186955 A | 3/2002 |
| EP | 1297950 A | 4/2003 |
| WO | 00/56791 A | 9/2000 |
| WO | 01/94123 | 12/2001 |
| WO | 02/11984 | 2/2002 |
| WO | WO 0211984 A1 * | 2/2002 |

* cited by examiner

*Primary Examiner* — Chanceity Robinson
(74) *Attorney, Agent, or Firm* — Tristan A. Fuierer; Moore & Van Allen, PLLC

(57) ABSTRACT

The invention provides a near infrared absorption polymer comprising at least two different pendent infra-red chromophoric moieties covalently bonded to the backbone of an alkali-soluble resin, at least one of which is an indole cyanine dye and the other of which is a benz[e]-indole cyanine dye. When used in the coating of a heat sensitive positive working lithographic printing plate precursor the stabilization time needed after manufacture is significantly reduced, avoiding further conditioning processes before use. The precursors are preferably imagewise exposed with a near-infrared laser emitting at between 780 nm and 850 nm.

14 Claims, No Drawings

THERMALLY REACTIVE INFRARED ABSORPTION POLYMERS AND THEIR USE IN A HEAT SENSITIVE LITHOGRAPHIC PRINTING PLATE

CROSS-REFERENCE TO RELATED APPLICATIONS

This application is filed under the provisions of 35 U.S.C. §371 and claims the priority of International Patent Application No. PCT/EP2005/012029 filed on 8 Nov. 2005, which in turn claims priority of European Application No. 04078079.3 filed on 9 Nov. 2004.

FIELD OF THE INVENTION

This invention relates to film forming polymers which have, attached to the backbone of an alkali-soluble resin, at least two pendent infra-red moieties selected from two different classes of cyanine type dyes; and to heat sensitive positive working lithographic printing plate precursors comprising them.

BACKGROUND OF THE INVENTION

The lithography printing process is based on the general principle that ink and water are immiscible. In conventional wet lithography ink as well as water are applied simultaneously to the plate surface. In positive working lithographic printing plates the hydrophobic or oleophilic areas of the image, formed following exposure and development of the plate, will accept ink, whereas the hydrophilic or oleophobic non image areas, the background revealed following exposure and development, will accept water. The ink on the image is then transferred to the surface to be printed, for example paper, via an intermediate rubber blanket (offset printing).

In general lithographic printing plate precursors are formed by the application of a radiation sensitive coating to an anodised aluminium substrate. So called conventional printing plates have coatings that are sensitive to UV radiation, in positive working lithographic plates the solubility of the coating increases on imagewise exposure and therefore can be removed by the developer during the post exposure development step. In negative working plates the coating is insolubilized on imagewise exposure and the unexposed areas would be removed during development.

For many years conventional UV sensitive positive working lithographic plates have been based on the fact that the dissolution rate of novolak resins by aqueous alkaline solutions is strongly inhibited by diazonaphthaquinone (DNQ) sulphonates. This inhibition of dissolution is caused by the formation of a very stable hydrogen bonded matrix between the novolak hydroxy groups and the DNQ sulphonate groups (Arnost Reiser, Journal of Imaging Science and Technology, Volume 42, Number 1, January/February 1998, p. 15-22).

When exposed to UV radiation the photo-decomposition of the DNQ structure to the corresponding indene carboxylic acid, a reaction known as the Wolff rearrangement which is fast and highly exothermic, creates a high intensity heat spike which effectively releases the novolak from the hydrogen bonded matrix, and allows its penetration and dissolution by the aqueous alkaline developer. Due also to the formation of the readily soluble carboxylic by-products, this increase in dissolution rate can be as much as three orders of magnitude, leading to a very good image discrimination.

Recently, the above mentioned phenomenon of the inhibition of dissolution of novolak resins has been used with very good success in the compositions of lithographic printing plates precursors which can be used together with new generations of exposure technologies. Following developments in the field of digital and laser imaging, the so-called computer-to-plate or CTP technologies, the printing and graphics arts industries now require printing plates which can be efficiently exposed using these new technologies, known as direct laser addressable printing plate precursors.

Within the different types of direct laser addressable exposure equipment technologies (CTP technologies) the most widespread development has been in exposure equipment using lasers diodes emitting light in the near infrared (IR) wavelength region of 780-850 nm. These systems have come to be known as Thermal systems.

Thermal plate precursors for use with Thermal CTP equipment fall into two distinct categories, negative working and positive working.

In negative working thermal plate precursors IR absorbing compounds are used in conjunction with photo-acid generators (radiation induced decomposition of latent Brönsted acids) to insolubilize the binder polymer. The energy delivered by the laser is insufficient to fully complete the reaction and insolubilize the composition, and therefore the reaction is completed by a heating step prior to development of the precursor. These precursors are known as negative working pre-heat thermal plates.

In positive working thermal plate precursor compositions, the laser light is converted to heat by the IR absorbing compound and this heat is used, analogous to the conventional UV sensitive DNQ sulphonate/novolak compositions, to directly break the dissolution inhibiting hydrogen bonds formed between the binder polymer and the IR dye absorber, itself acting as an inhibitor, and any other additional inhibitor.

In practice the hydrogen bonds generated between the binder polymer, such as a novolak resin, and any non IR sensitive inhibitor can also be broken by the heat produced directly from the laser, but such a plate precursor would need a very high energy to bring about this change and would not be commercially viable.

In thermal positive plate precursors of the IR dye/novolak type compositions the IR dye thus has a dual function, firstly as the light to heat converting material, and secondly as the (co-)inhibitor of dissolution for the novolak resin. The IR dye can be described as imparting both the required IR sensitivity and the dissolution inhibition effect at the same time.

Following the processes of coating and drying the precursor during line manufacture, thermal plates need to undergo a process of stabilization in order to achieve the formation of the hydrogen bonded network which imparts the needed insolubility characteristics of the coating. However, due to the weak nature of the hydrogen bond forming capacity of typical IR absorbing dyes, the thermal printing plate precursors manufactured using coating compositions containing a blend of IR dye and novolak resin form only a weak matrix, and therefore this stabilization process proceeds very slowly at ambient temperatures (in comparison with DNQ/novolak systems). In order to avoid long storage times at ambient temperatures, the process duration time can be accelerated by a period of bulk storage of the precursors in conditioning ovens at controlled elevated temperature and relative humidity.

EP 0823327 discloses positive lithographic printing plate precursors comprising photosensitive compositions showing a difference in solubility in alkaline developer between exposed and unexposed portions, the composition comprising a photo-thermal conversion material and a high molecular compound, of which the solubility in an alkali developer is changeable by a change other than a chemical change. Many of the examples, such as Examples 1-10 and 74-77, disclose photosensitive compositions comprising phenolic resins/novolaks which are coated onto aluminium plates with a film thickness of 2.4 g/m², dried and then subjected to stabilization at 55° C.

EP 1024958 discloses a method of manufacturing a positive no preheat thermal sensitive lithographic plate precursor which compromises a coating composition containing a phenolic resin on a substrate, the drying of the composition and the subsequent heat treatment of the coated substrate, wherein the heat treatment is carried out for at least 4 hours, and preferably for at least 48 hours, at a temperature in the range 40-90° C., preferably at least 50° C. and not in excess of 60° C. In the description the applicants state that they believe that if the elected temperature is too low then the time taken for the formation of the stable network structure will be too long to be of practical use. The formulations contain blends of phenolic resins and infrared absorbing compounds. The dry film coating weights of the compositions on the substrate is in the range of 2.0-2.5 g/m². Although the method is useful for providing stable and consistent lithographic plate precursors, there are penalties in increased costs and production time through the need for an extra manufacturing process (in practice it is known that even at elevated temperatures this process time can be in excess of 10 days).

WO 02/11984 discloses a composition for a positive no preheat thermal sensitive lithographic plate precursor whose coating composition comprises of a hydroxyl group containing polymer (for example a novolak resin) and a process for the method of manufacture wherein the coating weight of the composition on the substrate is less than 1.1 g/m² preferably no more than 0.9 g/m². The patent application concerns a method to avoid the process conditioning step of heat-treating the plate precursor following coating and drying of the precursor on line. However the use of such low coat weights, in comparison with commonly used coating weights, can lead to a significant reduction in the durability of the plate, as for example in the useful print life of the plate and resistance to press room chemicals.

If such plate precursors are supplied to the end-user customers before the completion of the stabilization process then the process will continue at the customers premises leading to an unacceptable adjustments having to be made by the customer in the exposure and development process parameters. On the other hand, if the plate manufacturer does not precisely control this extra conditioning process then it can add considerably to the variation in the same finished product characteristics (plate sensitivity and development parameters). There are also obvious penalties for the manufacturer in terms of increased costs due to energy consumption, increased manufacturing lead times and complexity of supply logistics.

Despite the progress that has already been made in attempting to provide stable and consistent plate precursors there is still a need for compositions which do not require the additional problematic conditioning process in order to provide a stable product.

In the above cited patents, the formulations of the precursor coating compositions use the IR dye in a blend or admixture with the novolak resin, but it is also known that the infrared absorbing compound can take the form of a pendent chromophore group attached to the polymer backbone.

U.S. Pat. No. 6,124,425 discloses thermally reactive near infrared absorption polymer coatings, methods for preparing and methods for use. The patent teaches the preparation of both negative and positive working type sensitive polymers and the preparation of lithographic plates containing the polymers.

WO 01/94123 teaches the preparation and use of polymers containing a cyanine dye attached to the polymer backbone, the polymer additionally comprises o-quinonediazide groups attached to the same backbone as an extra inhibitor of dissolution.

EP 1186955 discloses the use of film forming polymers containing an infrared chromophore in the preparation of masks, mask precursors, electronic parts, and their precursors. The patent is not concerned with the preparation of lithographic plates.

EP 1297950 discloses polymers for use in the preparation of lithographic plates comprising a chromophoric moiety which absorbs visible light in the wavelength region of 400 to 780 nm. The patent is concerned with the attachment of colorant dyes to the polymer backbone to avoid staining of the lithographic plate substrate.

The above cited patents applications are concerned with the problems of multi-component systems in manufacture or dye migration thereafter, but not with the post manufacturing conditioning process. In these patent applications all examples refer to the use of only one chromophore type attached to the polymer backbone.

It is the object of the present invention to overcome the disadvantages of thermal sensitive positive lithographic plate precursors that require a lengthy post manufacturing conditioning process at elevated temperature and which do not suffer a reduced latitude in their performance.

SUMMARY OF THE INVENTION

Surprisingly, we have found that the attachment of two different classes of cyanine dye to the same polymer backbone improves the precursor stabilization considerably and in a manner that could not have been predicted, and to such an extent that further conditioning process would not be necessary.

In a first aspect, the invention is directed to a near infrared absorption polymer comprising at least two different pendent IR chromophoric moieties covalently bonded to the backbone of an alkali-soluble resin, at least one of which is an indole cyanine dye and the other of which is a benz[e]-indole cyanine dye.

In one embodiment the alkaline-soluble polymer is an alkali-soluble phenolic resin, preferably a Novolak resin.

The indole cyanine dye is preferably selected from the group formed by
1-Butyl-2-(2-[3-[2-(1-butyl-3,3-dimethyl-1,3-dihydro-indol-2-ylidene)-ethylidene]-2-chloro-cyclohex-1-enyl]-vinyl)-3,3-dimethyl-3H-indolium hexafluorophosphate,
2-[2-[2-Chloro-3-[2-(1,3-dihydro-1,3,3-trimethyl-2H-indol-2-ylidene)-ethylidene]-1-cyclopenten-1-yl]-ethenyl]-1,3,3-trimethyl-3H-indolium chloride, or
2-[2-[2-Chloro-3-[2-(1,3-dihydro-1,3,3-trimethyl-2H-indol-2-ylidene)-ethylidene]-1-cyclopenten-1-yl]-ethenyl]-1,3,3-trimethyl-3H-indolium 4-methylbenzenesulfonate or other salts thereof.

The benz[e]-indole cyanine dye is preferably selected from the group formed by
2-[2-[2-Chloro-3-[2-(3-ethyl-1,3-dihydro-1,1-dimethyl-2H-benzo[e]indol-2-ylidene)-ethylidene]-1-cyclohexen-1-yl]-ethenyl]-3-ethyl-1,1-dimethyl-1H-benzo[e]indolium tetrafluoroborate, or
3-Butyl-2-(2-[3-[2-(3-butyl-1,1-dimethyl-1,3-dihydro-benzo[e]indol-2-ylidene)-ethylidene]-2-chloro-cyclohex- 1-enyl]-vinyl)-1,1-dimethyl-1H-benzo[e]indolium hexafluorophosphate, or other salts thereof.

In the near infrared absorption polymer of the invention the number ratio of total pendent IR chromophoric moieties relative to the parent polymer is preferably comprised in the range from 1:50 to 1:3, more preferably in the range from 1:30 to 1:5.

In another aspect the invention is directed to a heat sensitive positive working lithographic printing plate precursor comprising a substrate and a near infrared absorption polymer as previously defined in a layer coated on the substrate. Preferably the dry coat weight of the coating layer comprising a near infrared absorption polymer is in the range 1.4-1.9 g/m$^2$.

The invention is also directed to a process of manufacture of such a printing plate precursor which comprises a) applying to a substrate a composition in a solvent wherein the composition comprises a near infrared absorption polymer as previously defined and b) drying the coated substrate to give the plate precursor.

The invention is also directed to a method of producing a printing form from the heat sensitive positive working lithographic printing plate precursor previously defined, comprising a) imagewise exposing the plate precursor with a near-infrared laser emitting at between 780 nm and 850 nm and b) developing the precursor in a developing solution to remove the exposed areas; and to the printing form so obtainable.

DETAILED DESCRIPTION OF THE INVENTION

None of the prior art teaches or encourages the attachment of two different classes of cyanine chromophores directly to the polymer backbone of an alkali-soluble resin. Surprisingly it was found that the addition of a second chromophore group of the cyanine dye type to the alkali-soluble resin gives an unexpected positive synergistic effect on the stabilization time for precursors made with this composition. It improves the stabilization process of the precursor to such an extent that the need for a further process is not necessary, the process completing itself with days storage at room temperature.

Whilst not wishing to be bound by any particular theory it is thought that this surprising effect in the stabilization of the precursor is given by the improved sterric hindrance given by the two covalently bound chromophores of different molecular structures, thereby causing a more stable matrix which is able to resist unwanted penetration and dissolution of the unexposed areas by the developer.

The alkali-soluble resin to be used in the preparation of the polymeric dye used in the photosensitive composition of the present invention may be any resin used in this type of lithographic printing plate precursors which contains nucleophilic groups capable of reacting with the infra-red absorbing cyanine dye. They are well known in the art, their dissolution rate in an alkaline developer increases after exposure to radiation.

Preferably phenolic resins are used. They are condensation reaction products between appropriate phenols, for example phenol itself, C-alkyl substituted phenols (including cresols, xylenols, p-tert-butyl-phenol, p-phenylphenol and nonyl phenols), diphenols e.g. bisphenol-A(2,2-bis(4-hydroxyphenyl) propane, and appropriate aldehydes, for example formaldehyde, chloral, acetaldehyde and furfuraldehyde. The type of catalyst and the molar ratio of the reactants used in the preparation of phenolic resins determines their molecular structure and therefore the physical properties of the resin. An aldehyde:phenol ratio between 0.5:1 and 1:1, preferably 0.5:1 to 0.8:1 and an acid catalyst is used to prepare those phenolic resins generally known as novolaks which are thermoplastic in character. Higher aldehyde:phenol ratios of more then 1:1 to 3:1, and a basic catalyst would give rise to a class of phenolic resins known as resoles, and these are characterised by their ability to be thermally hardened at elevated temperatures.

More preferably the resin used as backbone of the near infrared absorption polymer is a novolak resin. Depending on the preparation route for the condensation a range of phenolic materials with varying structures and properties can be prepared. The novolak resin may be one prepared by acid catalysed condensation of at least one member selected from aromatic hydrocarbons such as the C-alkyl substituted phenols, m-cresol, o-cresol, p-cresol, with at least one aldehyde selected from aldehydes such as formaldehyde or acetaldehyde. Instead of the formaldehyde and acetaldehyde, paraformaldehyde and paraldehyde may, respectively, be used. The weight average molecular weight calculated as polystyrene, measured by gel permeation chromatography (hereinafter referred to simply as GPC) of the novolak resin (the weight average molecular weight by the GPC measurement will hereinafter be referred to as Mw) is preferably from 1,000 to 15,000, particularly preferably from 1,500 to 10,000. The aromatic hydrocarbon of the novolak resin is preferably a novolak resin obtained by the co-condensation of at least one phenol selected from C-alkyl substituted phenols, o-cresol, m-cresol, p-cresol, with at least one member selected from aldehydes such as formaldehyde or acetaldehyde. Among these, preferred is a novolak resin which is a co-condensation product of an aldehyde with a phenol comprising m-cresol/p-cresol in a molar ratio of 70/30 to 30/70, or with a phenol comprising phenol/m-cresol/p-cresol in a range of molar ratios of 10 to 100/0 to 60/0 to 40. Among aldehydes, formaldehyde is particularly preferred.

The polymeric dye may be prepared for example by reacting the above resins with a mixture of two appropriate indole and benz[e]indole cyanine infra-red dyes containing a reactive halogen atom under standard conditions to promote the required dehydrohalogenation. The conditions of reaction are analogous to those described for example in U.S. Pat. No. 6,124,425, WO 01/94123, EP 1186955, and EP 1297950 mentioned before, but using sequential or simultaneous addition of the two dyes instead of only one dye. Preferably the two dyes to be linked to the resin backbone are added simultaneously as a mixture.

The number ratio of the total infra-red chromophores to the alkali-soluble resin is suitably in the range 1:50 to 1:3, preferably in the range 1:30 to 1:5. The ratios are calculated such that, for example, 1:50 is equal to 1 part by weight total IR dye (0.5+0.5 if equal parts of both dyes) to 50 parts by weight novolak i.e. 2% by weight, or 1:3 equals 1 part total dyes to 3 parts novolak i.e. 33.3% by weight.

Suitable cyanine dyes containing indole substituent include:

1-Butyl-2-(2-[3-[2-(1-butyl-3,3-dimethyl-1,3-dihydro-indol-2-ylidene)-ethylidene]-2-chloro-cyclohex-1-enyl]-vinyl)-3,3-dimethyl-3H-indolium hexafluorophosphate, 2-[2-[2-Chloro-3-[2-(1,3-dihydro-1,3,3-trimethyl-2H-indol-2-ylidene)-ethylidene]-1-cyclopenten-1-yl]-ethenyl]-1,3,3-trimethyl-3H-indolium chloride, or 2-[2-[2-Chloro-3-[2-(1,3-dihydro-1,3,3-trimethyl-2H-indol-2-ylidene)-ethylidene]-1-cyclopenten-1-yl]-ethenyl]-1,3,3-trimethyl-3H-indolium 4-methylbenzenesulfonate.

Suitable cyanine dyes containing benz[e]-indole substituent include:

2-[2-[2-Chloro-3-[2-(3-ethyl-1,3-dihydro-1,1-dimethyl-2H-benzo[e]indol-2-ylidene)-ethylidene]-1-cyclohexen-1-yl]-ethenyl]-3-ethyl-1,1-dimethyl-1H-benzo[e]indolium tetrafluoroborate, or 3-Butyl-2-(2-[3-[2-(3-butyl-1,1-dimethyl-1,3-dihydro-benzo[e]indol-2-ylidene)-ethylidene]-2-chloro-cyclohex-1-enyl]-vinyl)-1,1-dimethyl-1H-benzo[e]indolium hexafluorophosphate.

It is understood that other salts of both types of dyes can be used in the process of preparation of the near infrared absorption polymer. These dyes and their salts are commercially available.

The number ratio of the indole to benz[e]-indole in the resultant polymeric dye is suitably in the range 1:1 to 1:5, preferably in the range 1:1 to 1:2, more preferably 1:1.

The resulting polymeric dye may be blended with binder resins in the final coating composition, suitable resins include the variations of novolaks described above, preferably novolaks of different m-cresol/p-cresol ratios and molecular weights in order to optimise the dissolution rate of the final composition.

Other additional components can be optionally present in the coating composition. The infrared-sensitive composition may additionally comprise a colorant to aid in visual inspection of the exposed and developed plate precursor. This facilitates both visual detection of image defects and the use of an image densitometer. Suitable colorants are those that dissolve well in the solvent or solvent mixture used for coating. Typical examples include triarylmethane dyes and phthalocyanine dyes. Examples of preferred dyes include basic oil-soluble dyes such as Crystal Violet, Malachite Green, Victoria Blue, Methylene Blue, Ethyl Violet, Basic Blue 7, CI Basic Blue 11, CI Basic Blue 26, Victoria Blue R, Victoria Blue BO, Solvent Blue 35, Ethyl Violet, and Solvent Blue 36. Preferably the imaging layer contains an indicator dye which is present in an amount of about 0.05 to about 10 weight percent and preferably from about 0.1 to about 5 weight percent, based on the weight of the composition.

According to need, surfactants may be added to the compositions so as to obtain characteristics required by the printing plate. Surfactants are employed in order to enhance the coating application to aluminium or polyester supports. Surfactants which can be employed include fluorocarbonated surfactants such as FC-430 by 3M Corporation or Zonyl Ns by DuPont, block polymers of ethylene oxide and propylene oxide known as Pluronic and manufactured by BASF, and polysiloxane surfactants such as BYK 377 manufactured by BYK Chemie. These surfactants improve the coating composition cosmetics during application to the substrate, avoiding imperfections and the appearance of voids on the layer. The amount of surfactant employed ranges from 0.01 to 0.5% by weight base on the total weight of solids in the composition.

The photosensitive composition to be used in the present invention is prepared usually by dissolving the above mentioned various components in a suitable solvent. The solvent is not particularly limited so long as it is a solvent, which provides sufficient solubility for the components used, and presents an excellent coating film property. It may, for example, be a cellosolve solvent such as methylcellosolve, ethylcellosolve, methylcellosolve acetate or ethylcellosolve acetate, a propylene glycol solvent such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate or dipropylene glycol dimethyl ether, an ester solvent such as butyl acetate, amyl acetate, ethyl butyrate, methyl lactate, ethyl lactate or methyl 3-methoxypropionate, a ketone solvent such as cyclohexanone, methyl ethyl ketone or acetone, or a mixture thereof. The proportion of the solvent is usually within a range of from 1 to 20 times in a weight ratio to the total amount of the photosensitive composition. Among such solvents an acetone/propylene glycol monomethyl ether blend is preferred.

The substrate employed in the lithographic plates of this invention can be any lithographic support. Such a substrate may be a metal sheet or a polymer film. Aluminium (including aluminium alloys) sheet is a preferred metal support. Particularly preferred is an aluminium support that has been electrochemically grained, anodized, and deposited with a barrier layer. Polyester film is a preferred polymeric film support. For wet lithographic plates, the substrate should have a hydrophilic surface, commonly, a wet lithographic plate has a hydrophilic substrate and an oleophilic photosensitive layer. Particularly preferred hydrophilic substrate for a wet lithographic plate is an aluminium support that has been electrochemically grained. The roughened surface can be further anodized to form a durable aluminium oxide surface using an acid electrolyte such as sulphuric acid and/or phosphoric acid. The roughened and anodized aluminium surface can be further treated to improve the hydrophilic properties of the surface. For example, the aluminium support may be silicated by treating its surface with sodium silicate solution at elevated temperature, e.g. 95° C. Alternatively, a phosphate treatment may be applied which involves treating the aluminium oxide surface with a phosphate solution that may further contain an inorganic fluoride. Hydrophilic polymer solutions such as polyvinyl phosphonic acid may also be used. Polyvinyl phosphonic acid and its copolymers are preferred polymers. Processes for coating a hydrophilic barrier layer on aluminium in lithographic plate application are well known in the art.

As a method for coating the photosensitive composition on the surface of a support to be used in the present invention, a conventional method such as meniscus coating, is preferred, more preferably the coating of the plate is done via a forward roll meniscus type coater, the percentage coating solids for this type of application is in the range 5-15% w/w with the solvent or solvent mixture, depending on the line speed and applicator roll speed. The coating is applied such as to have a dry coating weight in the range from about 1.2 g/m$^2$ to about 2.0 g/m$^2$. More preferably, from about 1.4 g/m$^2$ to about 1.9 g/m$^2$ is used.

The lithographic printing plate precursor of the present invention is subjected to a drying process following coating. The more preferred method is a method of adjusting the temperature in the drying process in several steps. In the first drying step, which takes place in the coating cabinet, the temperature range and the drying time are set so that drying is carried out for at least 10 seconds to the completion point of constant rate drying of the photosensitive layer after coating. Here, the completion point of constant rate drying is the time from the initiation of the drying until the evaporation process of the coated film reaches the internal diffusion-determined step. The amount of the remaining solvent at the completion of the first drying step is preferably within 8 wt %, more preferably within 6 wt %, to the photosensitive material. The drying temperature in the first drying step is, preferably at least 25° C., and preferably at most 60° C., and more preferably at most 45° C. Then, in the second four zone drying step, the remaining solvent is gradually reduced to preferably at most 2 wt %, more preferably at most 1 wt %. The drying temperatures of the zones in the second drying step can be equal or graduated in order to slowly raise the temperature and then lower before exiting the zone. Graduated is preferred. The temperature in these zones is preferably at least 100° C., more preferably at least 130° C., preferably at most 140° C.

After drying the coated substrate is cut in line to give the lithographic printing plate precursors of the present invention. They are then stored at room temperature to allow for stabilization. As shown in the examples, a stabilization time as short as 4 to 7 days is sufficient to give a stable and consistent lithographic printing plate precursor of the invention.

In another aspect the invention is directed to a positive working lithographic printing form obtained after imagewise irradiation and processing of the above described precursor. Imagewise exposure causes a change in the dissolution rate differential between the unexposed part of the IR sensitive coating and the exposed part of the coating. During development the exposed part is dissolved to form the image.

The exposure can be carried out with a direct laser addressable exposure equipment (CTP technologies). Examples of lasers which can be used include semiconductor diode lasers emitting at between 600 nm and 1400 nm, especially between 780 nm and 850 nm. Examples are the diode laser platesetter sold by Creo under the trade mark Trendsetter, which emits at 830 nm, or the Dainippon Screen PlateRite 8000 having a nominal laser output wavelength at 808 nm, but any laser of sufficient imaging power and whose radiation is absorbed by the composition may be used. Further details of the laser exposure process are well known by the person skilled in the art, and are further discussed in the above mentioned patent applications.

The sensitivity of the plate precursor of the invention is highest when matched exactly with the wavelength emitted by the laser of the imaging equipment, such that a plate precursor composition sensitised to 830 nm will have a lower sensitivity in equipment emitting at 808 nm, and vice versa. With the near infrared absorption polymer of the invention having two different types of chromophores of different peak absorption we have the further advantage that the required sensitivity in both 830 nm and 808 nm equipment is maintained.

Following irradiation the exposed plate is developed through an automatic processor with a suitable developer composition. The developer composition is dependent on the nature of the polymeric substance, in the present invention an alkaline aqueous solution is preferred. The pH of the developer is typically in the range 11-13, with a conductivity of 70-80 mS. The automatic processor parameters depend on the model used, but development would typically be done at a temperature range of 20-25° C., and for an immersion time of 25-35 seconds. The necessary conditions for the development of thermal plates are well known to those skilled in the art.

The invention is further illustrated with the following examples, that should not be interpreted as limitative of the scope of the claims.

EXAMPLES

Glossary of Materials Used in the Examples

Rütaphen 6564 LB is a phenol/cresol novolak resin from Bakelite AG
Rütaphen 744 LB is a cresol novolak resin from Bakelite AG
Sodium hydride (60% in mineral oil) from Aldrich Chemicals
Methyl Violet 10B (Crystal Violet) from Manuel Vilaseca SA
Byk 377 is a polysiloxane surfactant from Byk Chemie Germany
Dye 1:
2-[2-[2-Chloro-3-[2-(1,3-dihydro-1,3,3-trimethyl-2H-indol-2-ylidene)-ethylidene]-1-cyclohexen-1-yl]-ethenyl]-1,3,3-trimethyl-3H-indolium 4-methyl benzenesulfonate
Dye 2:
2-[2-[2-Chloro-3-[2-(1,3-dihydro-1,1,3-trimethyl-2H-benzo[e]-indol-2-ylidene)-ethylidene]-1-cyclohexen-1-yl]-ethenyl]-1,1,3-trimethyl-1H-benzo[e]indolium 4-methyl benzenesulfonate
T500 is a positive CTP plate developer commercialised by Ipagsa Industrial S.L.

In all examples, unless stipulated parts are parts by weight.

Example 1

Confirmation of the Improved Stabilization Time and Plate Sensitivity

Preparation of the Polymeric Dye

A solution was prepared of 150 parts of the Novolak resin Rütaphen 6564 LB in 400 parts of N,N-dimethyl formamide. To this solution was slowly added 0.2 parts of sodium hydride (60% in mineral oil) at 60° C. under constant stirring and nitrogen atmosphere. The reaction was stirred for 60 minutes. To the reaction mixture was slowly added 3 parts of 2-[2-[2-Chloro-3-[2-(1,3-dihydro-1,3,3-trimethyl-2H-indol-2-ylidene)-ethylidene]-1-cyclohexen-1-yl]-ethenyl]-1,3,3-trimethyl-3H-indolium 4-methyl benzenesulfonate (Dye 1 peak absorption $\lambda_{max}$ 775 nm in MeOH), and 3 parts of 2-[2-[2-Chloro-3-[2-(1,3-dihydro-1,1,3-trimethyl-2H-benzo[e]-indol-2-ylidene)-ethylidene]-1-cyclohexen-1-yl]-ethenyl]-1,1,3-trimethyl-1H-benzo[e]indolium, 4-methyl benzenesulfonate (Dye 2, $\lambda_{max}$ 813 nm in MeOH), dissolved in 100 parts of N,N-dimethyl formamide.

The reaction was continued for 4 hours under nitrogen atmosphere. The solution was then cooled to room temperature and the product isolated by precipitation into water. The product was then collected by vacuum filtration, washed with water and dried in air.

Coating Solution Preparation

A coating solution was prepared by dissolving 30 parts of the above prepared polymeric dye containing two different chromophores, 10 parts Rütaphen 744 LB, 0.7 parts Methyl Violet, 0.1 parts Byk 377, 250 parts acetone, and 14 parts propylene glycol monomethyl ether.

Plate Precursor Preparation

The plate was prepared by web coating on line onto grained and anodised substrate which had been post anodically treated on line with a aqueous solution of phosphate/fluoride. The line speed was 15 meters per minute. The coating was applied using a meniscus coater with an applicator roller of a diameter of 250 mm at a speed of 15 rpm. The wet weight applied was 24 g/m². The coating cabinet air temperature was 38° C.

The web was then dried in an hot air recirculation oven with four separate zones, zone 1 at 100° C., zone 2 125° C., zone 3 132° C., zone 4 120° C., the total dwell time in the oven was 2 minutes 30 seconds. Following drying, the web was cut on line and the plate precursors stacked with interleaving with no further heat treatment. The dry coat weight of the precursor was in the range 1.6-1.7 g/m². The residual solvent in the precursors was determined to be less than 1.2%.

Plate Sensitivity and Stabilization Testing

The precursors were imaged with an area of 7% screen dots and with a power series (swaths of increasing energy from 80-180 mJ/cm² at 5 mJ/cm² intervals). The precursors were imaged on both a Creo Trendsetter 3244 (nominal laser output wavelength of 830 nm) and a Dainippon Screen PlateRite 8000 (nominal laser output wavelength 808 nm).

The precursors were developed in the Ovit Sirius processor operating at a speed of 1.0 m/min using Ipagsa developer T500 at 25° C.

Following development of the plate the clearing point of the plate was recorded. This point being defined as the value of the particular energy swarth where the coating has been fully removed revealing a clean substrate. A reading of the % dot value was also taken using a CC Dot 520 dot meter.

Thereafter the precursors were tested daily for 14 days using the same procedures, after 14 days the precursors were tested once per week until in total seven weeks had transpired. The results are shown in Table 1, the numerical value is the clearing point in each equipment type, the black circle denotes that the range of variation of dot values was not acceptable due to image attack by the developer, the white circle denotes the variation falls within an acceptable value.

The table shows the reduced stabilization time and improved sensitivity in the equipment types of this composition in comparison with the comparative examples below.

Comparative Example 2

Use of Only One Class of Cyanine Dye Containing Benz[e]-Indole Substituent

A polymeric dye was prepared using the procedure of example 1 using only Dye 1 but maintaining equal the relationship of total dye concentration to novolak concentration.

The coating solution and plate precursor preparation was also as example 1, as was the plate stabilization and testing regimes. The results of these tests are shown in Table 1.

The table shows the increased stabilization time needed for this composition.

Comparative Example 3

Use of Only One Class of Cyanine Dye Containing Indole Substituent

A polymeric dye was prepared using the procedure of example 1 using only Dye 2 but maintaining equal the relationship of total dye concentration to novolak concentration.

The coating solution and plate precursor preparation was also as example 1, as was the plate stabilization and testing regimes. The results of these tests are shown in Table 1.

The table shows the increased stabilization time needed for this composition.

Comparative Example 4

Use of a Blend of the Two Polymeric Dyes from Examples 2 & 3

The polymeric dyes of examples 2 and 3 were prepared again using the procedure of example 1 The coating solution was prepared according to the formulation in example 1 except that portions of each polymeric dye were admixed such that the total sum of the parts of the two polymeric dyes in the coating formulation equalled the concentration relationship in the coating formulation of example 1. The plate precursor preparation was also as example 1, as was the plate stabilization and testing regimes. The results of these tests are shown in Table 1.

The results show that the time needed for stabilization is increased over the composition of example 1 whilst the sensitivity is approximately equal.

TABLE 1

| Time Days | Ex 1 830 nm | Ex 1 808 nm | Ex 2 830 nm | Ex 2 808 nm | Ex 3 830 nm | Ex 3 808 nm | Ex 4 830 nm | Ex 4 808 nm |
|---|---|---|---|---|---|---|---|---|
| 0  | 70 ● | 70 ● | 85 ● | 70 ● | 70 ● | 85 ● | 70 ● | 70 ● |
| 1  | 90 ● | 85 ● | 90 ● | 75 ● | 75 ● | 90 ● | 80 ● | 80 ● |
| 2  | 110 ● | 100 ● | 100 ● | 85 ● | 85 ● | 100 ● | 85 ● | 85 ● |
| 3  | 120 ● | 115 ● | 105 ● | 90 ● | 90 ● | 105 ● | 90 ● | 90 ● |
| 4  | 125 ○ | 125 ○ | 110 ● | 95 ● | 95 ● | 110 ● | 95 ● | 95 ● |
| 5  | 130 ○ | 130 ○ | 115 ● | 95 ● | 95 ● | 115 ● | 100 ● | 100 ● |
| 6  | 135 ○ | 135 ○ | 120 ● | 100 ● | 100 ● | 120 ● | 105 ● | 105 ● |
| 7  | 135 ○ | 135 ○ | 125 ○ | 100 ● | 100 ● | 125 ○ | 110 ● | 110 ● |
| 8  | 140 ○ | 140 ○ | 130 ○ | 105 ● | 105 ● | 130 ○ | 115 ● | 115 ● |
| 9  | 140 ○ | 140 ○ | 135 ○ | 110 ● | 110 ● | 135 ○ | 115 ● | 115 ● |
| 10 | 140 ○ | 140 ○ | 140 ○ | 120 ○ | 120 ○ | 140 ○ | 120 ● | 120 ● |
| 11 | 140 ○ | 140 ○ | 150 ○ | 130 ○ | 130 ○ | 150 ○ | 125 ● | 125 ● |
| 12 | 140 ○ | 140 ○ | 155 ○ | 135 ○ | 135 ○ | 155 ○ | 125 ○ | 125 ○ |
| 13 | 140 ○ | 140 ○ | 160 ○ | 140 ○ | 140 ○ | 160 ○ | 130 ○ | 130 ○ |
| 14 | 140 ○ | 140 ○ | 165 ○ | 140 ○ | 140 ○ | 165 ○ | 135 ○ | 135 ○ |
| 21 | 140 ○ | 140 ○ | 165 ○ | 140 ○ | 140 ○ | 165 ○ | 135 ○ | 135 ○ |
| 28 | 140 ○ | 140 ○ | 165 ○ | 140 ○ | 140 ○ | 165 ○ | 140 ○ | 140 ○ |
| 35 | 140 ○ | 140 ○ | 165 ○ | 140 ○ | 140 ○ | 165 ○ | 140 ○ | 140 ○ |
| 42 | 140 ○ | 140 ○ | 165 ○ | 140 ○ | 140 ○ | 165 ○ | 145 ○ | 145 ○ |
| 49 | 140 ○ | 140 ○ | 165 ○ | 140 ○ | 140 ○ | 165 ○ | 145 ○ | 145 ○ |

In the above table the columns show the plate sensitivity (clearing point determined visually) in mJ/cm². The columns headed 830 nm are the clearing point results using a Platesetter with 830 nm laser, those headed 808 nm are using a Platesetter with 808 nm laser. The symbol ● denotes unacceptable image attack by the developer, ○ denotes acceptable or no attack.

Comparative Example 5

Use of a Blend of Novolak Resin and Non Covalently Bonded IR Dyes

The coating solution of example 1 was again prepared except that portion of polymeric dye of that example was replaced by an admixture of the novolak resin and the two dyes. The coating thus prepared has the same proportions of dyes to novolak resin as example 1 but the dyes were not covalently bonded to the phenolic resin. The plate precursor preparation was also as example 1, as was the plate stabilization and testing regimes. The results of these tests are shown in Table 2.

The results show that the stabilization time needed is greatly increased over the composition of example 1.

Comparative Example 6

Use of the Same Composition as Example 1 but with Reduced Coat Weight

Plate precursors of example 1 were prepared except that the dry coat weight was reduced to 1.0 g/m² by a reduction in the coating roller applicator speed. The plate stabilization and testing regimes were as in example 1.

The results show that the use of a lower coat weight requires a longer stabilization time compared with example 1.

TABLE 2

| Time Days | Ex 5 830 nm | Ex 5 808 nm | Ex 6 830 nm | Ex 6 808 nm |
| --- | --- | --- | --- | --- |
| 0 | 70 ● | 70 ● | 50 ● | 50 ● |
| 1 | 80 ● | 80 ● | 60 ● | 60 ● |
| 2 | 85 ● | 85 ● | 70 ● | 70 ● |
| 3 | 90 ● | 90 ● | 75 ● | 75 ● |
| 4 | 95 ● | 95 ● | 80 ● | 80 ● |
| 5 | 100 ● | 100 ● | 85 ● | 85 ● |
| 6 | 105 ● | 105 ● | 90 ● | 90 ● |
| 7 | 110 ● | 110 ● | 95 ● | 95 ● |
| 8 | 115 ● | 115 ● | 100 ● | 100 ● |
| 9 | 115 ● | 115 ● | 105 ● | 105 ● |
| 10 | 120 ● | 120 ● | 110 ● | 110 ● |
| 11 | 125 ● | 125 ● | 115 ● | 115 ● |
| 12 | 125 ● | 125 ● | 120 ○ | 120 ○ |
| 13 | 130 ● | 130 ● | 125 ○ | 125 ○ |
| 14 | 135 ● | 135 ● | 125 ○ | 125 ○ |
| 21 | 135 ● | 135 ● | 130 ○ | 130 ○ |
| 28 | 140 ○ | 140 ○ | 130 ○ | 130 ○ |
| 35 | 140 ○ | 140 ○ | 130 ○ | 130 ○ |
| 42 | 145 ○ | 145 ○ | 130 ○ | 130 ○ |
| 49 | 145 ○ | 145 ○ | 130 ○ | 130 ○ |

The invention claimed is:

1. A near infrared absorption polymer comprising at least two different pendent infra-red chromophoric moieties covalently bonded to the backbone of an alkali-soluble resin, wherein at least one of the pendent infra-red chromophoric moieties is an indole cyanine dye and the other of which is a benz[e]-indole cyanine dye.

2. A near infrared absorption polymer as defined in claim 1, characterized in that the resin is an alkali soluble phenolic resin.

3. A near infrared absorption polymer as defined in claim 1, characterized in that the indole cyanine dye is selected from the group consisting of
1-Butyl-2-(2-[3-[2-(1-butyl-3,3-dimethyl-1,3-dihydro-indol-2-ylidene)-ethylidene]-2-chloro-cyclohex-1-enyl]-vinyl)-3,3-dimethyl-3H-indolium hexafluorophosphate,
2-[2-[2-Chloro-3-[2-(1,3-dihydro-1,3,3-trimethyl-2H-indol-2-ylidene)-ethylidene]-1-cyclopenten-1-yl]-ethenyl]-1,3,3-trimethyl-3H-indolium chloride, or
2-[2-[2-Chloro-3-[2-(1,3-dihydro-1,3,3-trimethyl-2H-indol-2-ylidene)-ethylidene]-1-cyclopenten-1-yl]-ethenyl]-1,3,3-trimethyl-3H-indolium 4-methylbenzenesulfonate and other salts thereof.

4. A near infrared absorption polymer as defined in claim 1, characterized in that the benz[e]-indole cyanine dye is selected from the group consisting of
2-[2-[2-Chloro-3-[2-(3-ethyl-1,3-dihydro-1,1-dimethyl-2H-benzo[e]indol-2-ylidene)-ethylidene]-1-cyclohexen-1-yl]-ethenyl]-3-ethyl-1,1-dimethyl-1H-benzo[e]indolium tetrafluoroborate, or
3-Butyl-2-(2-[3-[2-(3-butyl-1,1-dimethyl-1,3-dihydro-benzo[e]indol-2-ylidene)-ethylidene]-2-chloro-cyclohex-1-enyl]-vinyl)-1,1-dimethyl-1H-benzo[e]indolium hexafluorophosphate, and other salts thereof.

5. A near infrared absorption polymer as defined in claim 1, characterized in that the number ratio of indole cyanine dye to benz[e]-indole cyanine dye is comprised in the range of 1:1 to 1:5.

6. A near infrared absorption polymer as defined in claim 5, characterized in that the number ratio of indole cyanine dye to benz[e]-indole cyanine dye is about 1:1.

7. A near infrared absorption polymer as defined in claim 1, characterized in that the number ratio of total pendent IR chromophoric moieties relative to the parent alkali-soluble resin is comprised in the range from 1:50 to 1:3.

8. A heat sensitive positive working lithographic printing plate precursor comprising a substrate and a layer coated thereon, wherein the layer comprises the near infrared absorption polymer as defined in claim 1.

9. A heat sensitive positive working lithographic printing plate precursor as defined in claim 8 wherein a dry coat weight of the coating layer comprising the near infrared absorption polymer is in the range 1.4-1.9 g/m².

10. A process of manufacture of a heat sensitive positive working lithographic printing plate precursor, said process comprising:
a) applying to a substrate a composition in a solvent wherein the composition comprises a near infrared absorption polymer as defined in claim 1 to form a coated substrate; and
b) drying the coated substrate to produce the plate precursor.

11. A method of producing a printing form from a heat sensitive positive working lithographic printing plate precursor, said method comprising: a) imagewise exposing a printing plate precursor as defined in claim 8 with a near-infrared laser emitting at between 780 nm and 850 nm; and b) developing the precursor in a developing solution to remove the exposed areas.

12. A near infrared absorption polymer as defined in claim 1, characterized in that the resin is a novolak resin.

13. A near infrared absorption polymer as defined in claim 1, characterized in that the number ratio of indole cyanine dye to benz[e]-indole cyanine dye is comprised in the range of 1:1 to 1:2.

14. A near infrared absorption polymer as defined in claim 1, characterized in that the number ratio of total pendent IR chromophoric moieties relative to the parent alkali-soluble resin is comprised in the range from 1:30 to 1:5.

\* \* \* \* \*